UNITED STATES PATENT OFFICE.

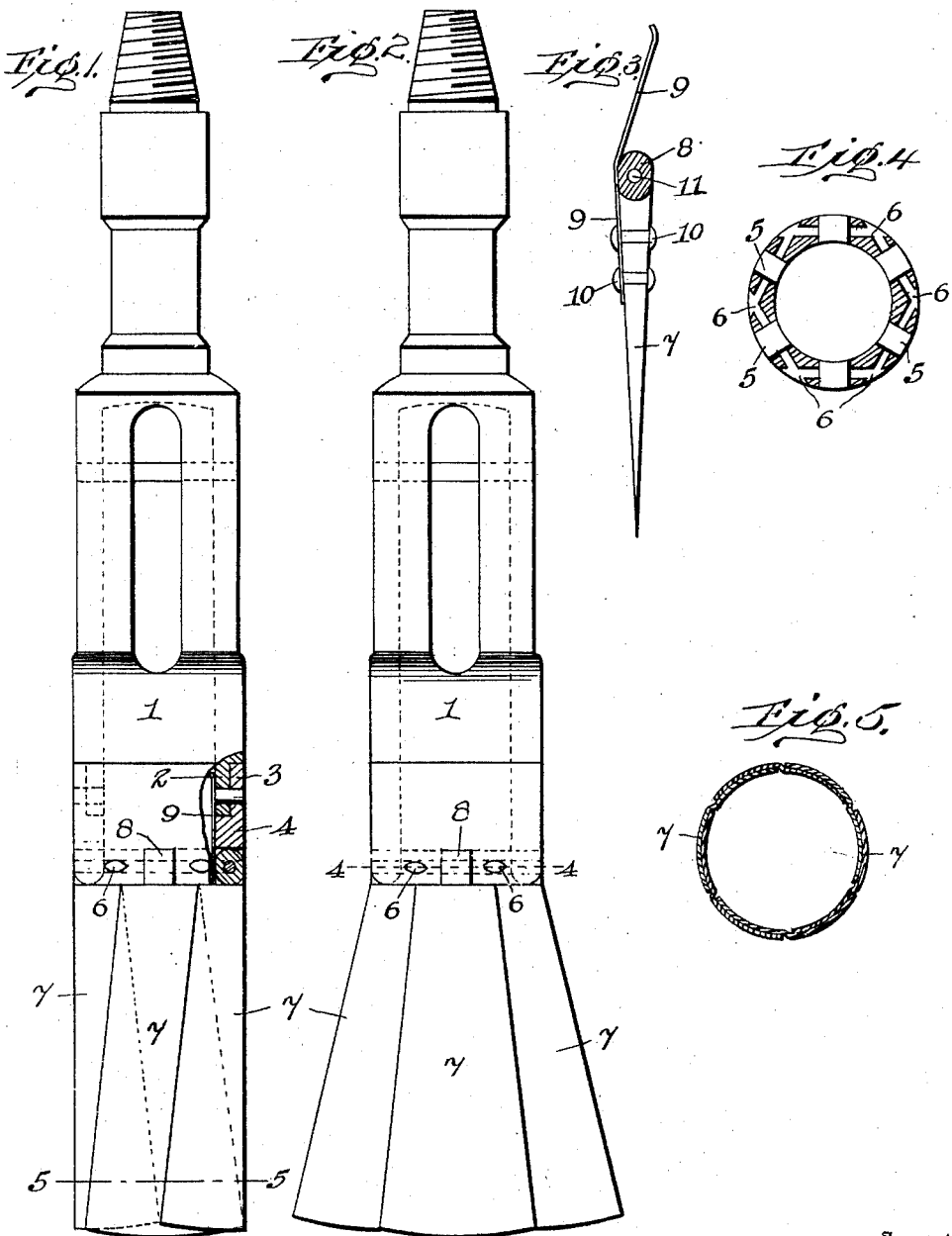

DAVID H. RATHBONE, OF DEXTER, TERRITORY OF NEW MEXICO.

ATTACHMENT FOR FISHING-TOOLS.

No. 868,809.

Specification of Letters Patent.

Patented Oct. 22, 1907.

Application filed April 4, 1907. Serial No. 366,445.

*To all whom it may concern:*

Be it known that I, DAVID H. RATHBONE, a citizen of the United States, residing at Dexter, in the county of Chaves and Territory of New Mexico, have invented certain new and useful Improvements in Attachments for Fishing-Tools, of which the following is a specification.

My invention relates to an improved expanding device for fishing tools, used in oil or water well drilling to recover lost portions of broken tools, etc., and the objects thereof are to provide an attachment for the ordinary fishing tool whereby the same may be allowed to cover the entire diameter of the well.

In drilling an oil well, should the bit or other tool break and the broken portion become fixed in the fissure of the rock and remaining upright, lay close against the well wall, it would be a long and tedious operation fishing for the same with the ordinary fishing tool and might not be successful in the end. The reason for this is that the casing or socket of the tool is thick and the broken piece in such a position would probably be missed altogether. It is a very serious matter when failure to locate and extract a lost tool occurs, as the only remedy is to either bore around the same or drill an entire new well. With my improvements it will be an easy matter to at once locate the lost tool and to withdraw same.

It will be understood that my invention has nothing to do with grappling the piece, but is simply adapted to spread over the entire space within the well and to force any lost tool standing therein to a central position in order that the slips of the ordinary construction carried within the socket to which my invention is attached may readily grasp the same preparatory to withdrawing.

Further advantages in the construction and arrangement of my improved tool will be pointed out hereinafter, reference being made to the accompanying drawings, in which, Figure 1, is a side elevation of a socket showing my improvements attached thereto, partly broken away, and in the folded position it will assume when passing through a portion of the well casing of small diameter. Fig. 2 is a similar view showing the same in the expanded position or the position the same will assume when on reaching an enlargement in the well. Fig. 3 is a side view partly in section of one of the wings detached. Fig. 4 is a cross section on the line 4—4 of Fig. 2, and Fig. 5, is a cross section on the line 5—5 of Fig. 1 and slightly exaggerated in form.

Referring to the figures, 1 represents a socket of the ordinary construction provided at its lower end with a detachable extension collar, 4 forming the body portion of my improved spreader. The flanges 2 and 3 are shown in Fig. 1 as riveted together, but I may connect them by means of a small tap bolt or shrink the flange 3 on flange 2 to connect them, each of which method has certain advantages. The collar 4 is preferably rounded on its lower circumferential edge and is provided therein with inter-spaced recesses 5 extending through the thickness of the wall and constructed radiating from the axis of said collar. The collar 4 is also provided with the tangential slots 6 extending through the wall thereof and intersecting said recesses 5 as shown in Fig. 4. A plurality of spreading wings 7 are concaved on their upper edges to form a snug joint against the rounded lower edge of the collar 4 when the tongue 8, constructed integral with and extending from said concaved upper edges of wings 7 is inserted within the recesses 5 of said collar. The wings 7 are preferably constructed thickest at their upper edges to strengthen same and taper gradually to a very thin lower edge taking up a minimum of space when spread within the well. To enhance the spreading of said wings I connect thereto the lower ends of leaf springs 9 by rivets or the like 10, the upper face ends of said springs being adapted to bear against the inner faces of the collar 4 and the socket 1. The wings 7 are arranged to overlap one another when contracted as shown in Fig. 1, the same being also shown in an exaggerated degree in Fig. 5 to more clearly show the idea and the position of the same when closed.

The tongues of the wings 7 are provided with central openings 11 therethrough adapted to register with the tangential slots 6, when said tongue is in position within the recesses 5. When so registered any suitable pin, preferably constructed of cold rolled steel, may be inserted in the said slots 6 and through the openings 11 thereby forming a substantial hinged joint.

Having fully described my invention I claim;

1. The combination with a fishing tool socket, of a plurality of overlapping expansible wings arranged at the lower end thereof, and means for expanding said wings, substantially as described.

2. The combination with a fishing tool socket, of a plurality of overlapping expansible wings hinged adjacent the lower end thereof, and springs arranged to expand said wings, substantially as described.

3. The combination with a fishing tool socket, of a collar arranged at its lower end, a plurality of overlapping expansible wings connected to said collar and means for expanding said wings, substantially as described.

4. The combination with a fishing tool socket, of a collar arranged thereon at its lower end and provided with recesses therein, a plurality of expansible wings pivotally mounted in said recesses, and means for expanding said wings, substantially as described.

5. The combination with a fishing tool socket, of a collar arranged thereon at its lower end, said collar being provided with recesses in its lower edge and with slots extending therethrough and intersecting said recesses, a plurality of overlapping expansible wings arranged beneath said collar and having apertured tongues extending within said recesses, a locking pin adapted to be projected through said slots and said apertured tongue, and springs for expanding said wings, substantially as described.

In testimony whereof I affix my signature in presence of two witnesses.

DAVID H. RATHBONE.

Witnesses:
U. S. CLARK,
WM. F. THAMAN.